United States Patent [19]

Alexander et al.

[11] Patent Number: 5,058,421
[45] Date of Patent: Oct. 22, 1991

[54] WATER LEAK AND WATER LEVEL DETECTOR

[75] Inventors: David V. Alexander, Elk Groove; Stephen W. Toy, Alta; Marvin March, Lincoln, all of Calif.

[73] Assignee: NEC Electronics Inc., Mountain View, Calif.

[21] Appl. No.: 535,072

[22] Filed: Jun. 8, 1990

[51] Int. Cl.$^5$ .............................................. G01M 3/40
[52] U.S. Cl. .................................. 73/49.2; 73/304 R; 340/620
[58] Field of Search ............... 73/49.2, 290 R, 304 R; 340/620, 618

[56] References Cited

U.S. PATENT DOCUMENTS 4,593,275  6/1986  Kazandjoglou .................... 340/620

FOREIGN PATENT DOCUMENTS 1232020  5/1971  United Kingdom ................ 340/618

OTHER PUBLICATIONS

Cohn, G. *Versatile Moisture & Light Detector.* In Electronics Australia, vol. 41, No. 6, pp. 98-101, Sept. 1979.

Retawmatic Model 317A Detector literature—2 pages—1989.
Water Alert Alarm Catalog 88 by Dorlen Products—cover and p. 6—recites use since 1974.

*Primary Examiner*—Hezron E. Williams
*Assistant Examiner*—Joseph W. Roskos
*Attorney, Agent, or Firm*—Skjerven, Morrill, MacPherson, Franklin & Friel

[57] ABSTRACT

A leak and liquid level detector includes a transistor as its main operating element with a pair of normally open base contacts connected to the transistor base. The transistor emitter is connected to ground and the transistor collector is connected to a suitable audio alarm, or alarm light or to a programmable logic controller. When a liquid leak bridges over the base contacts, a power circuit is closed across the contacts biasing the transistor and causing an electrical signal to flow from the collector to actuate the alarm, light or controller. The base contacts are linearly adjustable to sense various leak heights. The detector in one mode of use can be positioned horizontally to detect leaks and in a second mode of use is positioned vertically to detect a change in a liquid level in a tank, pipe column or the like.

4 Claims, 1 Drawing Sheet

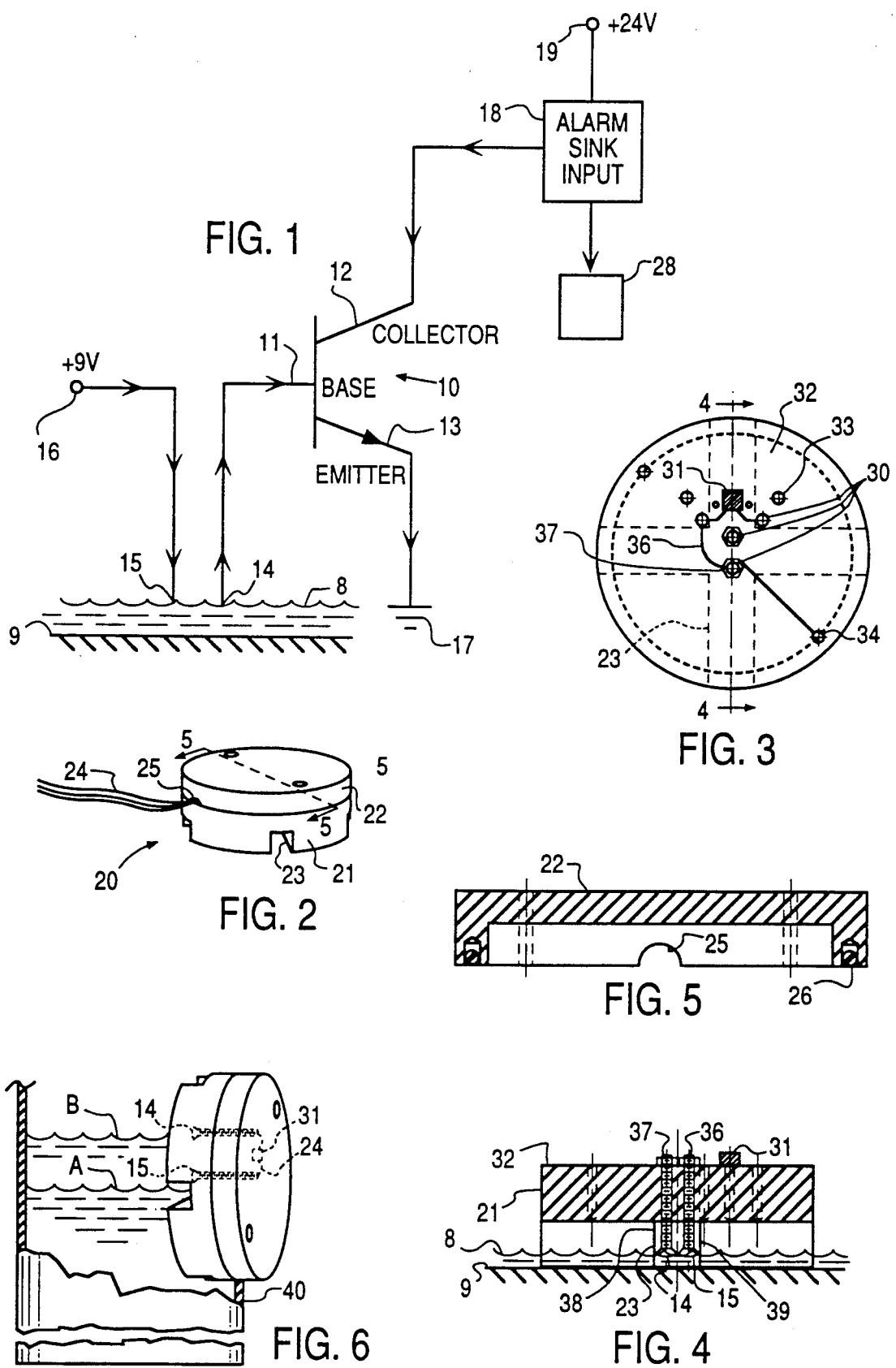

WATER LEAK AND WATER LEVEL DETECTOR

FIELD OF THE INVENTION

The present invention is directed to a liquid leak detector and level sensor. More particularly, the invention concerns a compact, simple detector for alerting an operator in one mode of use to the presence of a liquid leak in a tank or a leak from other equipment and in another mode of use alerting an operator or signalling a control means as to the reaching of a particular liquid level in a tank or in other equipment.

BACKGROUND OF THE INVENTION

Various electronic-type and mechanical-type leak detectors have been suggested for use with storage tanks. For example, U.S. Pat. No. 2,531,159 discloses a float which raises upon leaking fluid filling a float vessel and causes tilt movement of a mercury switch to shut down a burner and simultaneously activate a warning light or alarm bell. U.S. Pat. No. 4,653,312 describes the use of a sight glass, color changes, pressure transducers and floats to detect leaks and a change in liquid level with an electronically linked alarm system.

A surface water detector has been sold by Retawmatic Corp. of New York City as Model 317A which includes an apertured housing with a water-expandible cartridge touching the surface to be surveyed. The cartridge absorbs water and swells up, pressing against an internal switch which upon such pressure starts an alarm. The cartridge after swelling may be dehydrated by dryers or heaters so that it shrinks and is reusable. Dorlen Products of Milwaukee, Wis., sells a surface water sensing alarm under the trademark Water Alert ® which includes height adjustable 0-150 inch sensors, epoxy-encapsulated sensing and control circuitry and an electro-mechanical buzzer for alarm signalling.

The above sensors are relatively complex and expensive, have relatively high maintenance costs and are not very reliable. Further, they are not capable of accurately detecting a leak on a horizontal surface and also a vertical level of a liquid.

SUMMARY OF THE INVENTION

The present invention is directed to a simple, compact detector which is mountable on a horizontal surface such as a floor for detecting leaks at various leak height levels and which also can be mounted vertically on a vertical surface to sense the reaching of a particular raising or lowering liquid level. The detector finds utility not only in water leaks but with respect to leaks of caustic or acidic solutions while requiring minimum maintenance. Thus personnel in a production, or research area can be quickly and reliably alerted of potentially dangerous and costly liquid leaks, for example, in semiconductor fabrication installations.

The present leak detector includes as its means sensing element a transistor with a pair of base contacts, a power source and an alarm. The power source may be a 24 volt source provided by an input from a programmable logic controller. Upon a liquid leak, an electrical short occurs between the base contacts activating the transistor. Establishment of an electrical path through the single transistor is established which elicits an alarm input, for example, a programmable controller. An electrically insulating detector housing is provided, preferable of Delrin ® or other chemically-resistant plastic material, which is slotted to provide access of the leaking fluid or fluid level to bridge across the transistor base contacts. The resultant closing of the circuit including the normally-open base contacts forms a resistive contact between exposed end portions of the base contacts and a resultant forward bias of the transistor which, in turn, actuates an alarm circuit connected to the transistor collector. A powered alarm sink input typically receiving a +24 volt signal, when actuated by the liquid leak or level contact, inputs an alarm buzzer or light or programmed logic controller.

BRIEF DESCRIPTION OF THE DRAWINGS

FIG. 1 is a schematic view of the detector circuit.
FIG. 2 is a perspective view of the detector.
FIG. 3 is a top view of the detector lower housing.
FIG. 4 is a cross-sectional view of the detector lower housing taken on the line 4-4 of FIG. 3.
FIG. 5 is a cross-sectional view of the detector upper housing taken on the line 5-5 of FIG. 2.
FIG. 6 is a schematic cut-away view of the detector mounted in a tank showing use in a vertical liquid level sensing mode of operation.

DETAILED DESCRIPTION

A schematic diagram of each detector is seen in FIG. 1 where a transistor 10 comprising a base 11, collector 12 and emitter 13 forms the liquid sensing operating element. The base 11 has a pair of spaced contacts 14, 15, the former of which is connected to the base 11 and the latter is connected to a voltage source at terminal 16, typically +9 volts. The emitter 13 is connected to ground 17 and the connector is connected to an alarm sink input 18 fed a +24 volt input at terminal 19. The alarm sink input 18 is pulled down to ground when a valid input is received.

When the base contact 14, 15 are positioned on or above a surface 9, such as a floor surface, and that surface becomes covered by a leaking fluid 8, such as water or other conductive solution, the fluid acts as a resistive contact between base contacts 14, 15 thereby causing a forward bias of transistor 10. The transistor 10 may be of the NPN type such as a 2N2222 transistor manufactured by Fairchild Semiconductor. Operation of the transistor by a conductive fluid bridging across the contacts 14 and 15 causes the alarm sink input 18 to actuate an auditory alarm buzzer 28, or warning light or an input to a programmable logic controller for bypassing or closing an appropriate tank or other equipment valve to stop the liquid leak. The detection circuit is very simple but yet sensitive enough to detect a 20 megohm deionized water leak.

A GEX-90842 series programmable controller commercially available from General Electric FANVC of North America may be utilized. Such a controller (not shown) comprises an input/output device connected to each sensor to receive a "leak" signal therefrom and includes a central processor unit (CPU) for inputting a valve change in a liquid-containing tank or the like.

FIG. 2 illustrates the leak detection and liquid level detector two-part container housing 20 having a container base 21 and a container top cover 22. Cruciform-shaped passages 23 provide leaking fluid access to the base contacts. Power and output leads 24 enter and exit through a housing top marginal edge aperture 25 as seen in FIG. 5. The top and bottom housings are hermetically sealed by an O-ring 26 contained in a circular groove in the top cover so as to hermetically protect the transistor 10 positioned in the housing 20. The housing is shown in a circular pancake-like form mounted horizontally but may be of any exterior configuration. The housing is preferably constructed of an acid-resistant plastic such as a Delrin ® Acetalthermoplastic manufactured by DuPont Corporation.

FIG. 3 is a plan view of the lower housing with the top cover removed. A transducer package 31 is mounted on planar surface 32. Transistor connection terminals 30 also are positioned on surface 32 and connected to the detector exterior by leads 24. Tapped hole 33 functions to mount a transistor retaining strap. Apertures 34 are threaded to receive bolts (not shown) attaching the housing top 22 to the housing bottom 21.

The base contacts 14, 15 are in the form of adjustable threaded posts 37 and 38 (FIG. 4) which pass through apertures in the housing bottom from surface 32 to an intersection with cross passages 23. The contacts 14, 15 are adjustable in length by nuts 36, 37 so that the bottom ends of the contacts extend above the floor level 9 a set amount so that they can detect a particular height of leaking fluid on the floor. This level is normally set from about 0.01 mm to about 15 mm.

FIG. 6 illustrates the vertical mounting of the detector in a tank 40 (not to scale) in a liquid level sensing application. When the liquid level in the tank or pipe column is at level A, the contacts 14, 15 are above that level and there is no current flow into the transistor base 11. When the liquid level raises to level B, the liquid bridges across contacts 14, 15 biasing the base 11 and actuating the alarm or a controller. The level detector may function so that as a liquid level raises, the liquid bridges across the base contact end portions to complete a base contact electrical connection or as the liquid level drops below the two end contacts, an open circuit is then provided lending to the transistor base which can actuate a "low-level" alarm or indicate to a controller to perform a prescribed action such as audio/video warnings.

The above description of the preferred embodiment of this invention is intended to be illustrative and not limiting. Other embodiments of this invention will be obvious to those skilled in the art in view of the above disclosure.

What is claimed is:

1. A combined water leak and water level detector comprising:
   an electrically insulating housing;
   a transistor having a base, a collector and a ground-connected emitter, positioned in said housing;
   a pair of base contacts connectible in series to said base, end portions of each of said base contacts being in spaced juxtaposition to each other;
   a power source connected to one of said base contacts;
   access means in said housing for permitting a predetermined level of conductive liquid to bridge across said end portions to form a resistive contact between said base contact end portions and a resultant forward bias of said transistor;
   means connected to said collector and being actuatable by said resistive contact for indicating said liquid level; and
   in which said base contacts are adjustable in length such that they can detect various depth levels of a liquid leak.

2. A combined water leak and water level detector comprising:
   an electrically insulating housing;
   a transistor having a base, a collector and a ground-connected emitter, positioned in said housing;
   a pair of base contacts connectible in series to said base, end portions of each of said base contacts being in spaced juxtaposition to each other;
   a power source connected to one of said base contacts;
   access means in said housing for permitting a predetermined level of conductive liquid to bridge across said end portions to form a resistive contact between said base contact end portions and a resultant forward bias of said transistor;
   means connected to said collector and being actuatable by said resistive contact for indicating said liquid level; and
   wherein said housing is an essentially flat two-part container housing, said housing comprising a container base and a container cover, said transistor being mounted on said container base and being covered by said container cover, and wherein said base contacts extend from said base contacts transversely through said container base into an exterior-facing groove in a bottom surface of said container base.

3. The detector of claim 2 wherein said container is horizontally positioned on a horizontal mounting surface and said detector detects any leak fluid on said surface which bridges across said base contact end portions.

4. The detector of claim 2 wherein said container is vertically positioned on a vertical mounting surface and said detector detects a liquid level as said level raises to bridge across said end portions or drops to cease bridging across said end portions.

* * * * *